(12) United States Patent
Badawy

(10) Patent No.: US 9,997,948 B1
(45) Date of Patent: Jun. 12, 2018

(54) COMBINED TRIANGULAR POWER STRIP AND USB CHARGER

(71) Applicant: Salah Adam Badawy, Laguna Hills, CA (US)

(72) Inventor: Salah Adam Badawy, Laguna Hills, CA (US)

(*) Notice: Subject to any disclaimer, the term of this patent is extended or adjusted under 35 U.S.C. 154(b) by 49 days.

(21) Appl. No.: 14/886,511

(22) Filed: Oct. 19, 2015

Related U.S. Application Data

(63) Continuation-in-part of application No. 29/539,863, filed on Sep. 17, 2015.

(51) Int. Cl.
*H02J 7/00* (2006.01)
*H02J 7/02* (2016.01)
*H01R 13/66* (2006.01)
*H01R 13/68* (2011.01)

(52) U.S. Cl.
CPC ............ *H02J 7/022* (2013.01); *H02J 7/0042* (2013.01); *H02J 7/0052* (2013.01); *H02J 2007/0062* (2013.01)

(58) Field of Classification Search
CPC ....................................... H02J 7/022

USPC ................ 320/107, 111; 439/620.21, 620.29
See application file for complete search history.

(56) References Cited

U.S. PATENT DOCUMENTS

| | | | | |
|---|---|---|---|---|
| 6,315,617 B1* | 11/2001 | Al-Sabah | ........... | H01R 13/6666 439/652 |
| 8,096,817 B2* | 1/2012 | Lee | ........ | H01R 29/00 439/104 |
| 9,176,531 B1* | 11/2015 | Hayden | ................. | G06F 1/1632 |
| 9,219,341 B1* | 12/2015 | O'Keefe | ................ | H01R 31/02 |
| 9,423,844 B2* | 8/2016 | Strauser | ................... | G06F 1/266 |
| 2016/0141903 A1* | 5/2016 | Chen | ..................... | H02J 7/0052 320/111 |

* cited by examiner

*Primary Examiner* — Richard V Muralidar
(74) *Attorney, Agent, or Firm* — Selena Elansari

(57) ABSTRACT

A combined AC power strip and USB charger is provided, comprising: a triangular front surface; a triangular back surface; three side walls joining the front and back surfaces around their respective perimeters; an AC plug in the back surface; a plurality of AC outlets in the front surface coupled to the AC plug; a plurality of USB ports in each of the sidewalls; and circuitry configured to convert AC current to 5 volt DC current coupled to each of the USB ports.

1 Claim, 5 Drawing Sheets

COMBINED TRIANGULAR POWER STRIP AND USB CHARGER

RELATED APPLICATION DATA

The present application is a continuation-in-part of, and claims the benefit of, commonly-owned co-pending U.S. application Ser. No. 29/539,863 entitled COMBINED POWER STRIP AND USB CHARGER WITH THREE UNIVERSAL AC POWER OUTLETS AND NINE USB PORTS, filed on Sep. 17, 2015, which application is incorporated herein by reference in its entirety.

TECHNICAL FIELD

The present invention relates to providing power to multiple electronic devices.

BACKGROUND ART

Conventional power strips, which allow multiple AC powered devices to be plugged in to a single AC outlet, are typically bulky and inconvenient to transport. USB charging stations typically allow one or, at most two, electronic devices to be charged at the same time. Thus, a person must own and carry several different USB charging stations and power strips in order to provide power for many electronic devices.

SUMMARY OF THE INVENTION

The present invention provides a combined AC power strip and USB charger, comprising: a triangular front surface; a triangular back surface; three side walls joining the front and back surfaces around their respective perimeters; an AC plug in the back surface; a plurality of AC outlets in the front surface coupled to the AC plug; a plurality of USB ports in each of the sidewalls; and circuitry configured to convert AC current to 5 volt DC current coupled to each of the USB ports.

DETAILED DESCRIPTION OF THE PREFERRED EMBODIMENT

Figure 1:
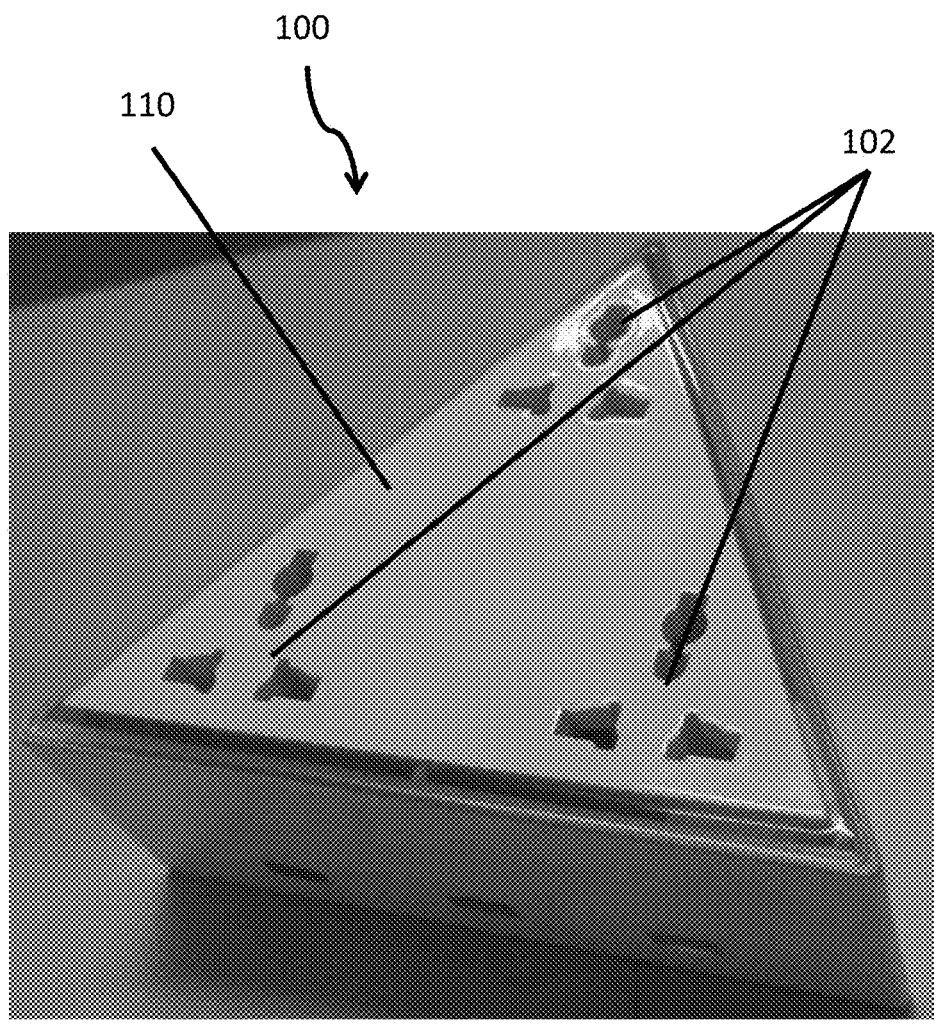
FIG. 1 is a front perspective view of the combined power strip and USB charger of the present invention.
Figure 2A:
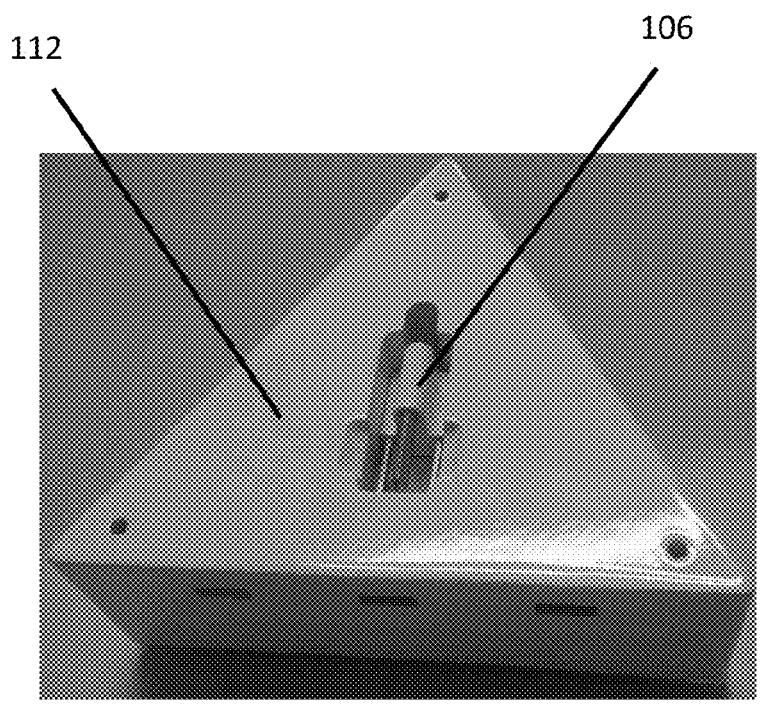
FIG. 2A is a rear perspective view of the combined power strip and USB charger of FIG. 1 with the plug in the folded position.
Figure 2B:
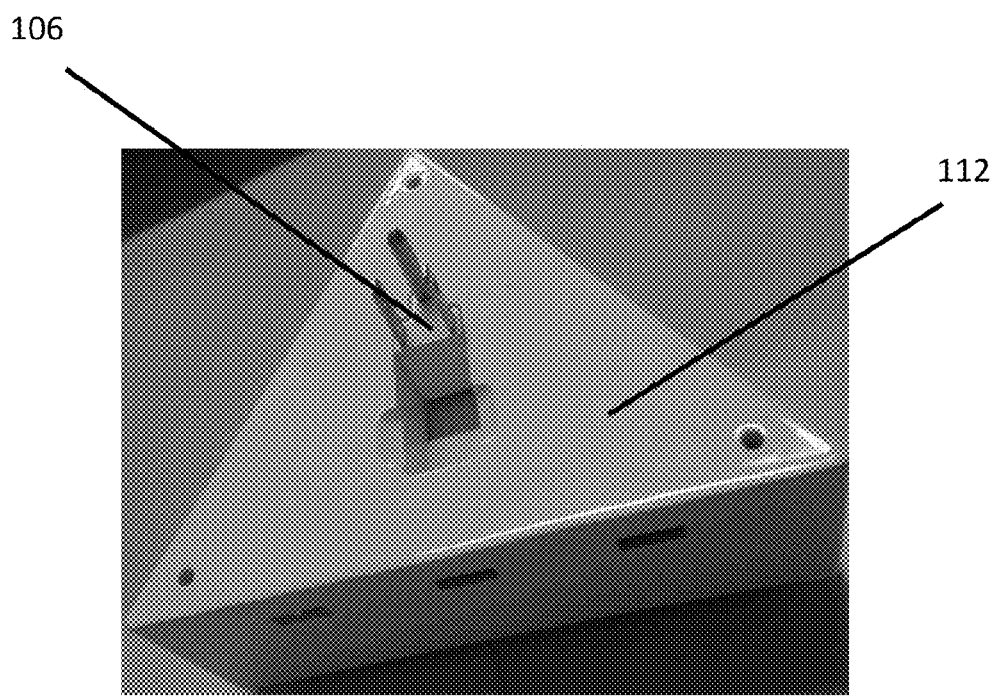
FIG. 2B is a rear perspective view of the combined power strip and USB charger of FIG. 1 with the plug in the extended position.
Figure 3:
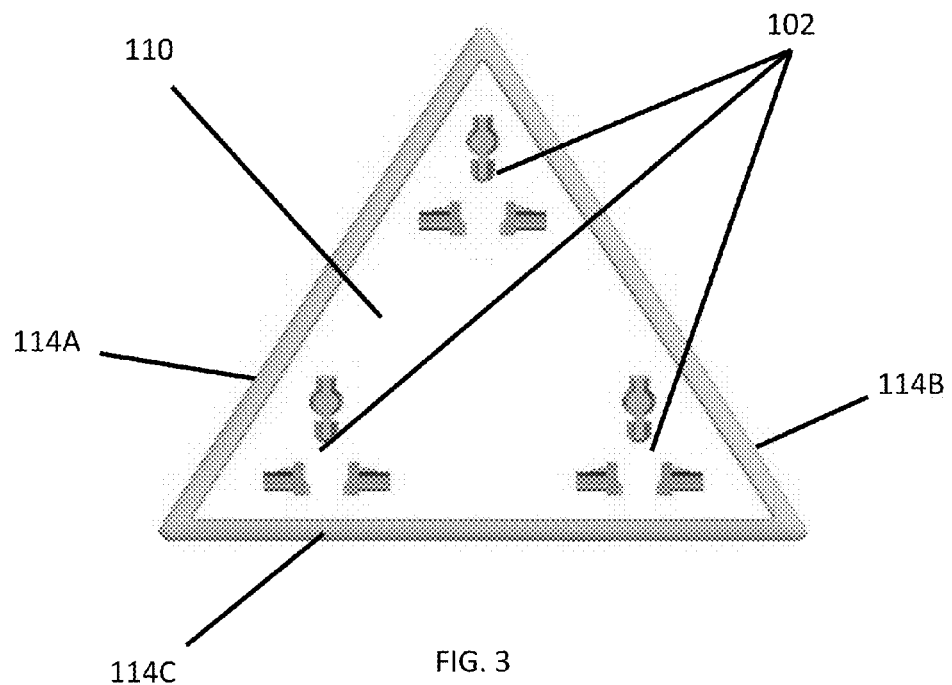
FIG. 3 is a top view of the combined power strip and USB charger of FIG. 1.
Figure 4:
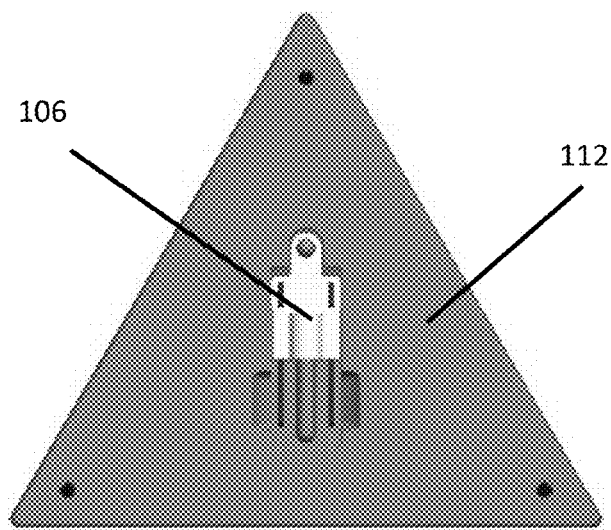
FIG. 4 is a bottom view of the combined power strip and USB charger of FIG. 1.
Figure 5:
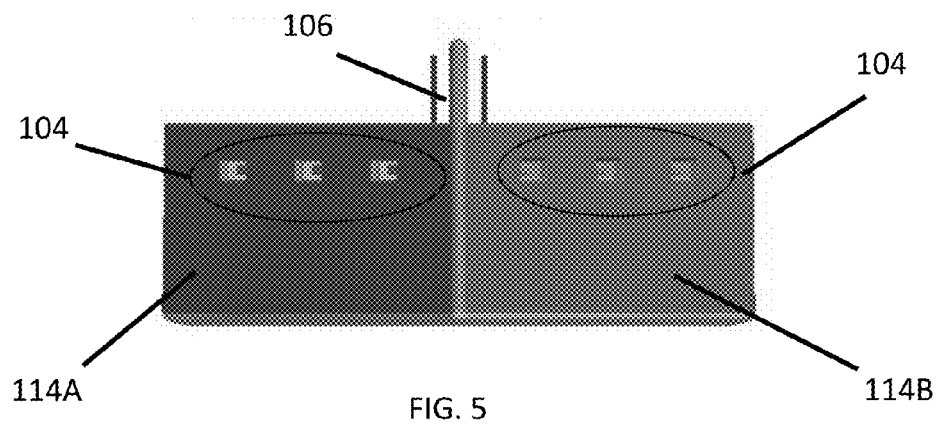
FIG. 5 is a front view of the combined power strip and USB charger of FIG. 1.
Figure 6:
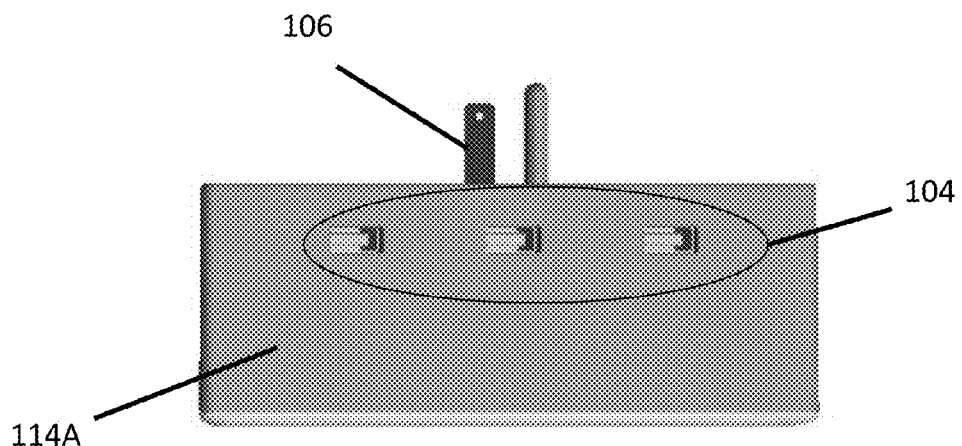
FIG. 6 is a right side view of the combined power strip and USB charger of FIG. 1, the left side view being a mirror image thereof.
Figure 7:
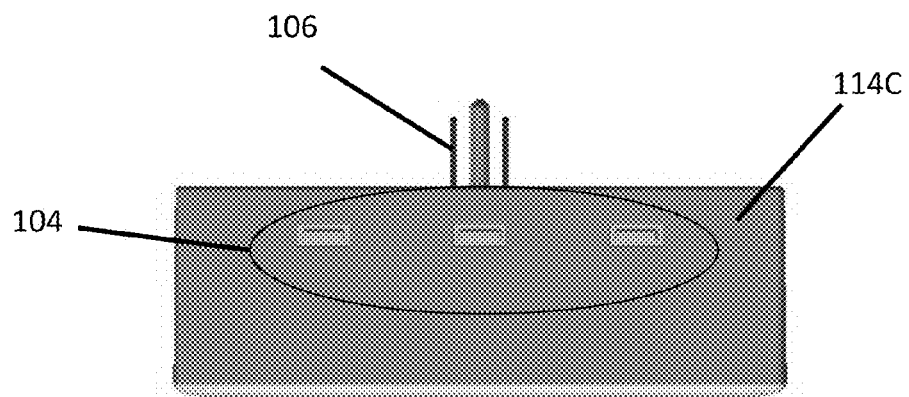
FIG. 7 is a rear view of the combined power strip and USB charger of FIG. 1.

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

FIGS. 1-7 illustrate various views of an embodiment of a combined power strip and USB charger 100 (herein referred to as the "device") of the present invention. The device 100 includes multiple AC power outlets 102, three in the illustrated embodiment, on the front surface 110 of the device 100 and multiple USB charging or power ports 104, nine in the illustrated embodiment. The device 100 also includes a plug 106 in the rear surface 112 of the device 100, which preferably folds flush with the back surface 112 of the device 100 (FIGS. 2A, 2B) and which supplies current to the AC power outlets 112.

The device 100 has triangular shaped front and back surfaces 110, 112 joined around their perimeters by three side walls 114A, 114B, 114C (collectively 114), making for a compact and conveniently transported package.

The AC power outlets 102 arrayed in the front surface 110 of the device 100 are sufficiently spaced apart to accommodate large charging blocks ("wall warts") as well as standard AC plugs. The AC power outlets 102 are preferably of the universal type to accommodate different plug configurations. The USB ports 104 are spaced apart on the sidewalls 114 of the device 100. In the illustrated embodiment, each of three sidewalls 114 includes three USB ports 104. Although the USB charging ports 104 illustrated in the FIGs. accommodate full size USB connectors, the device may also, or instead, include micro- and mini-USB ports or proprietary ports, such as Apple's Lightning port.

Figure 8:
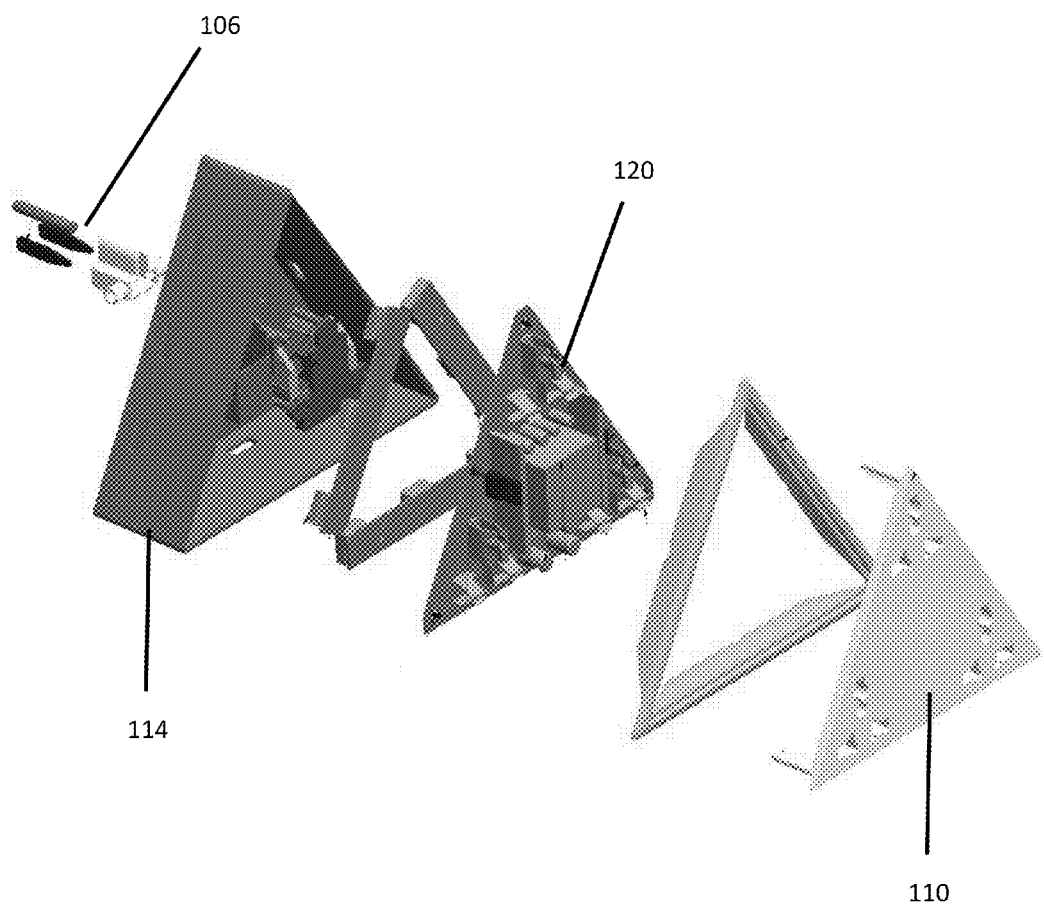
FIG. 8 is an exploded view of the combined power strip and USB charger of FIG. 1.

Circuitry 120 (FIG. 8) within the device 100 converts AC current to filtered 5 volt DC current supplied to the USB ports. An LED light on the front of the plug 106 illuminates when the device 100 is plugged in to provide a soft glow around the sides 114, useful as a night light.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A combined AC power adapter and USB charger, comprising:
   a bottom housing manufactured as one single unit wherein a triangular bottom plane is pierced in the center with an opening to accommodate an AC plug wherein the AC plug can be a folded prong or a fixed prong and the perimeter of the triangular bottom plane is flanked continuously by three side walls wherein each side wall is pierced with three openings fabricated to accommodate for three USB charging ports;
   a triangular base wherein the triangular base can be fitted inside the bottom housing unit wherein the triangular base is fabricated such that a triangular shape is cut out in the center to provide a base to accept a triangular shaped circuitry for the combined AC power adapter and the USB charger;

a circuitry configured to convert AC current to DC current whereby the circuitry can provide power to a light source wherein the light source is made of light-emitting diodes placed along the perimeter of the triangular shaped circuitry and whereby the circuitry can provide power to the nine USB charging ports spaced evenly on each of the three side walls and whereby the circuitry provides surge protection for the three AC outlets;

a triangular clear cover wherein a triangular shape is cut out in the center and wherein the triangular clear cover is attached on the rim of the side walls of the bottom housing unit whereby the light source can shine through the triangular clear cover;

a triangular top plane wherein a plurality of openings is fabricated to accommodate three AC outlets and wherein three posts protrude out from the bottom of the triangular top plane to secure onto the side walls of the bottom housing unit.

\* \* \* \* \*